(12) United States Patent
Ong et al.

(10) Patent No.: US 7,105,606 B2
(45) Date of Patent: *Sep. 12, 2006

(54) POLYMER BLENDS COMPRISING LOW MOLECULAR WEIGHT NITRILE RUBBER

(75) Inventors: Christopher M. Ong, London (CA); Frederic Guerin, Petrolia (CA)

(73) Assignee: LANXESS Inc., Sarnia (CA)

( * ) Notice: Subject to any disclaimer, the term of this patent is extended or adjusted under 35 U.S.C. 154(b) by 174 days.

This patent is subject to a terminal disclaimer.

(21) Appl. No.: 10/685,232

(22) Filed: Oct. 14, 2003

(65) Prior Publication Data

US 2004/0127647 A1 Jul. 1, 2004

(30) Foreign Application Priority Data

Oct. 17, 2002 (CA) .................................. 2409434

(51) Int. Cl.
*C08L 9/02* (2006.01)
*C08L 9/04* (2006.01)
*C08L 33/20* (2006.01)
*C08L 33/22* (2006.01)

(52) U.S. Cl. ...................... 525/232; 525/238
(58) Field of Classification Search ............ 525/232, 525/238
See application file for complete search history.

(56) References Cited

U.S. PATENT DOCUMENTS

| 4,421,884 A | 12/1983 | Oyama et al. ............ 524/209 |
| 4,647,627 A | 3/1987 | Buding et al. ............ 525/234 |
| 4,829,128 A | 5/1989 | Buding et al. ........... 525/329.6 |
| 6,780,939 B1 * | 8/2004 | Guerin et al. ............ 525/329.1 |
| 2003/0171518 A1 | 9/2003 | Magg et al. .............. 526/297 |
| 2004/0132906 A1 * | 7/2004 | Guerin et al. ............ 525/63 |

FOREIGN PATENT DOCUMENTS

| CA | 2 350 280 | 12/2002 |
| CA | 2 351 961 | 12/2002 |
| CA | 2 357 465 | 3/2003 |
| CA | 2 357 470 | 3/2003 |
| GB | 609722 | 3/1959 |

* cited by examiner

*Primary Examiner*—Nathan M. Nutter
(74) *Attorney, Agent, or Firm*—Jennifer R. Seng

(57) ABSTRACT

The present invention relates to a polymer blend containing at least one nitrile rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution, a process for preparing said polymer blend wherein at least one nitrile rubber polymer having a Mooney viscosity (ML 1+4 @ 100° C.) below 10 and at least one nitrile rubber polymer having a Mooney viscosity (ML 1+4 @ 100° C.) above 30 are mixed in a solvent and the blend is isolated from the solvent. The present invention also relates to a process for the manufacture of a shaped article including the step of injection molding the polymer blend.

13 Claims, 2 Drawing Sheets

POLYMER BLENDS COMPRISING LOW MOLECULAR WEIGHT NITRILE RUBBER

FIELD OF THE INVENTION

The present invention relates to a polymer blend containing at least one nitrile rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution, a process for preparing said polymer blend wherein at least one nitrile rubber polymer having a Mooney viscosity (ML 1+4 @ 100° C.) below 10 and at least one nitrile rubber polymer having a Mooney viscosity (ML 1+4 @ 100° C.) above 30 are mixed in a solvent and the blend is isolated from the solvent. The present invention also related to a process for the manufacture of a shaped article including the step of injection molding said polymer blend.

BACKGROUND OF THE INVENTION

Hydrogenated nitrile rubber (HNBR), prepared by the selective hydrogenation of acrylonitrile-butadiene rubber (nitrile rubber; NBR, a copolymer containing at least one conjugated diene, at least one unsaturated nitrile and optionally further comonomers), is a specialty rubber which has very good heat resistance, excellent ozone and chemical resistance, and excellent oil resistance. Coupled with the high level of mechanical properties of the rubber (such as, the high resistance to abrasion) it is not surprising that NBR and HNBR have found widespread use in the automotive (seals, hoses, bearing pads) oil (stators, well head seals, valve plates), electrical (cable sheathing), mechanical engineering (wheels, rollers) and shipbuilding (pipe seals, couplings) industries, amongst others. Commercially available HNBR has a Mooney viscosity in the range of from 55 to 105, a molecular weight in the range of from 200,000 to 500,000 g/mol, a polydispersity greater than 3.0 and a residual double bond (RDB) content in the range of from 1 to 18% (by IR spectroscopy).

One limitation in processing HNBR is the relatively high Mooney viscosity. In principle, HNBR having a lower molecular weight and lower Mooney viscosity would have better processability. Attempts have been made to reduce the molecular weight of the polymer by mastication (mechanical breakdown) and by chemical means (for example, using strong acid), but such methods have the disadvantages that they result in the introduction of functional groups (such as carboxylic acid and ester groups) into the polymer, and the altering of the microstructure of the polymer. This results in disadvantageous changes in the properties of the polymer.

A hydrogenated nitrile rubber having a low Mooney (<55) and improved processability, but which has the same microstructure as those rubbers which are currently available, is difficult to manufacture using current technologies. The hydrogenation of NBR to produce HNBR results in an increase in the Mooney viscosity of the raw polymer. This Mooney Increase Ratio (MIR) is generally around 2, depending upon the polymer grade, hydrogenation level and nature of the feedstock. Furthermore, limitations associated with the production of NBR itself dictate the low viscosity range for the HNBR feedstock. Currently, one of the lowest Mooney viscosity products available is Therban® VP KA 8837 (available from Bayer), which has a Mooney viscosity of 55 (ML 1+4 @ 100° C.) and a RDB of 18%.

Co-pending applications CA-2,351,961, CA-2,357,470, CA 2,350,280 and CA 2,357,465 disclose a low-Mooney NBR and HNBR and a method for producing said low-Mooney NBR and HNBR. While the disclosed NBR or HNBR being suitable for the present invention, said applications are silent about polymer blends containing the low-Mooney NBR and/or HNBR and methods of producing shaped articles from said low-Mooney NBR and/or HNBR.

SUMMARY OF THE INVENTION

The present invention relates to a polymer blend containing at least one nitrile rubber polymer having a Mooney viscosity (ML 1+4 @ 100° C.) below 10 (low-Mooney polymer) and at least one nitrile rubber polymer having a Mooney viscosity (ML 1+4 @ 100° C.) above 30 (high-Mooney polymer) wherein said polymer blend has a multi-modal molecular weight distribution. In the present invention, the NBR can be fully or partially hydrogenated ("HNBR"). The present invention relates to a polymer blend containing at least one, optionally hydrogenated, nitrile rubber polymer having a Mooney viscosity (ML 1+4 @ 100° C.) below 10, for example below 5, or for example below 1 and at least one nitrile rubber polymer having a Mooney viscosity (ML 1+4 @ 100° C.) above 30 wherein said polymer blend has a multi-modal molecular weight distribution. According to the present invention, the blend can have a bi- or tri-modal molecular weight distribution.

The present invention also relates to a process for preparing said polymer blend wherein at least one nitrile rubber polymer having a Mooney viscosity (ML 1+4 @ 100° C.) below 10 and at least one nitrile rubber polymer having a Mooney viscosity (ML 1+4 @ 100° C.) above 30 are mixed in a solvent and the blend is isolated from the solvent.

Further, the present invention relates to a process for the manufacture of a shaped article including the step of injection molding the polymer blend, for example, by liquid injection molding.

DETAILED DESCRIPTION OF THE INVENTION

Figure 1:
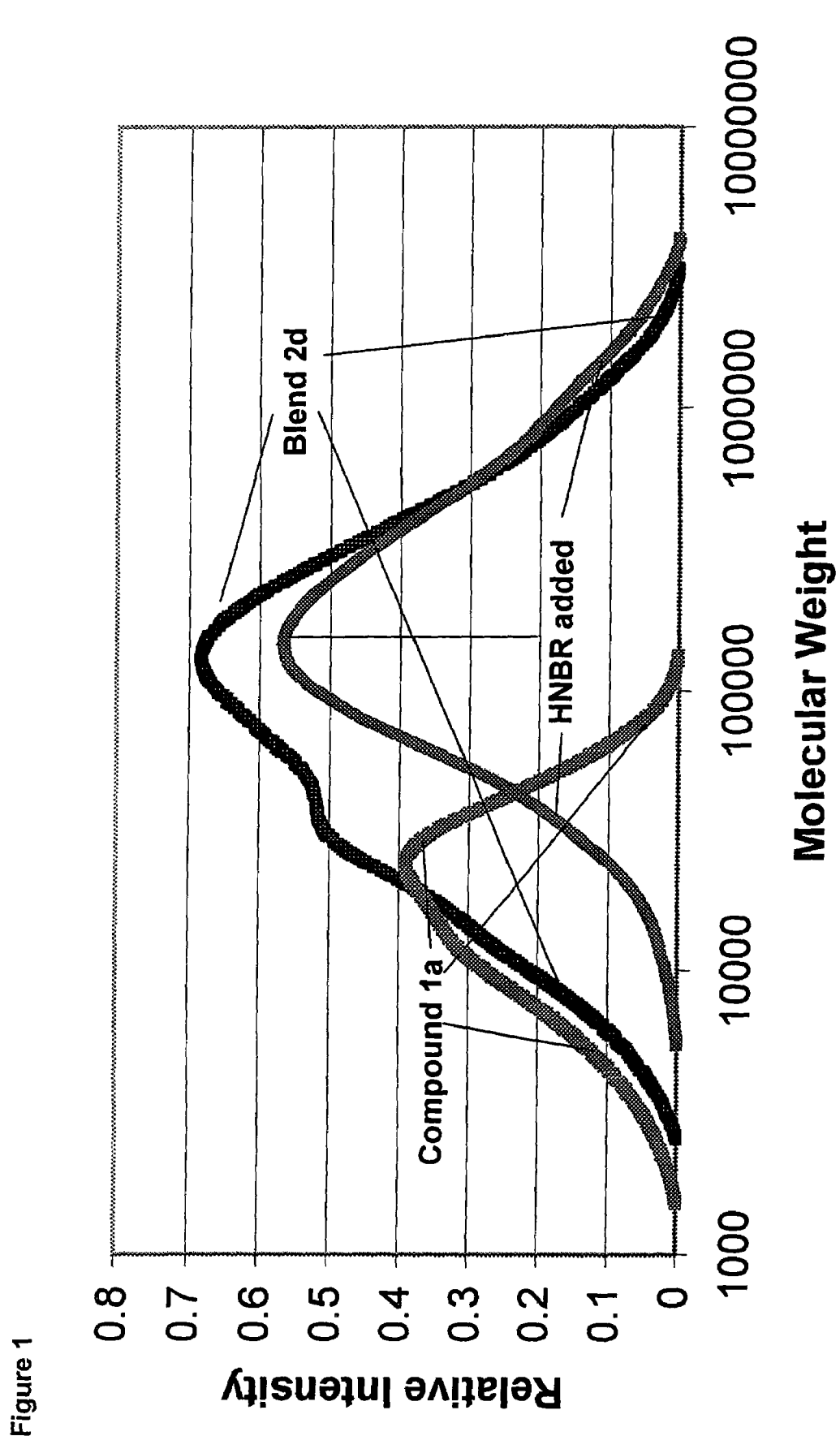
FIG. 1 illustrates the relative intensity in relation to the molecular weight of Compound 2d compared with the starting material.
Figure 2:
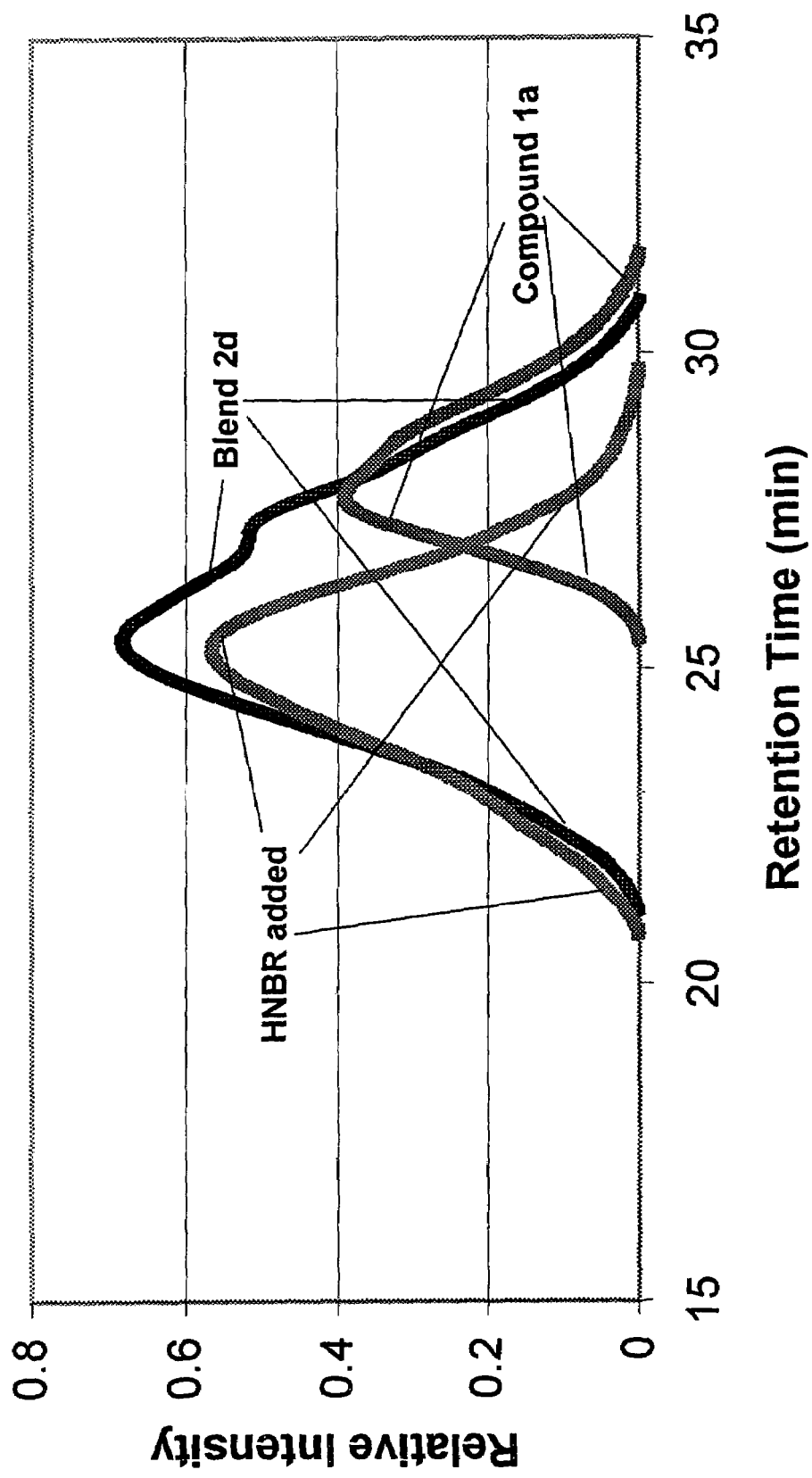
FIG. 2 illustrates the relative intensity in relation to the retention time of Compound 2d compared with the starting material.

The present invention will now be described for purposes of illustration and not limitation. Except in the operating examples, or where otherwise indicated, all numbers expressing quantities, percentages, and so forth in the specification are to be understood as being modified in all instances by the term "about." Also, all ranges include any combination of the maximum and minimum points disclosed and include any intermediate ranges therein, which may or may not be specifically enumerated herein.

As used throughout this specification, the term "nitrile polymer" or NBR is intended to have a broad meaning and is meant to encompass a copolymer having repeating units derived from at least one conjugated diene, at least one $\alpha,\beta$-unsaturated nitrile and optionally further one or more copolymerizable monomers.

The conjugated diene may be any known conjugated diene for example a $C_4$–$C_6$ conjugated diene. Useful conjugated dienes include butadiene, isoprene, piperylene, 2,3-dimethyl butadiene and mixtures thereof. For example, $C_4$–$C_6$ conjugated dienes such as butadiene, isoprene and mixtures thereof. Or for example, the $C_4$–$C_6$ conjugated diene can be butadiene.

The α,β,-unsaturated nitrile may be any known α,β-unsaturated nitrile, such as a $C_3$–$C_5$ α,β-unsaturated nitrile. Useful $C_3$–$C_5$ α,β-unsaturated nitriles include acrylonitrile, methacrylonitrile, ethacrylonitrile and mixtures thereof. For example, the $C_3$–$C_5$ α,β-unsaturated nitrile can be acrylonitrile.

The copolymer can contain in the range of from 40 to 85 weight percent of repeating units derived from one or more conjugated dienes and in the range of from 15 to 60 weight percent of repeating units derived from one or more unsaturated nitriles. For example, the copolymer can contain in the range of from 60 to 75 weight percent of repeating units derived from one or more conjugated dienes and in the range of from 25 to 40 weight percent of repeating units derived from one or more unsaturated nitriles. Or for example, the copolymer can contain in the range of from 60 to 70 weight percent of repeating units derived from one or more conjugated dienes and in the range of from 30 to 40 weight percent of repeating units derived from one or more unsaturated nitrites.

Optionally, the copolymer may contain repeating units derived from one or more copolymerizable monomers, such as unsaturated carboxylic acids. Non-limiting examples of suitable unsaturated carboxylic acids include fumaric acid, maleic acid, acrylic acid, methacrylic acid and mixtures thereof. Repeating units derived from one or more copolymerizable monomers will replace either the nitrile or the diene portion of the nitrile rubber and it will be apparent to the skilled in the art that the above mentioned figures will have to be adjusted to result in 100 weight percent. In case of the mentioned unsaturated carboxylic acids, the nitrile rubber can contain repeating units derived from one or more unsaturated carboxylic acids in the range of from 1 to 10 weight percent of the rubber, with this amount displacing a corresponding amount of the conjugated diolefin.

Other useful optionally further monomers include unsaturated mono- or di-carboxylic acids or derivatives thereof (e.g., esters, amides and the like) including mixtures thereof.

Hydrogenated in the present invention is understood by more than 50% of the residual double bonds (RDB) present in the starting nitrile polymer/NBR being hydrogenated, for example, more than 90% of the RDB are hydrogenated, or for example more than 95% of the RDB are hydrogenated or, further, for example more than 99% of the RDB are hydrogenated.

The Mooney viscosity of the rubber was determined using ASTM test D1646.

The inventive polymer blend contains at least one, optionally hydrogenated, NBR having a Mooney viscosity (ML 1+4 @ 100° C. according to ASTM test D1646) of less than 10, for example less than 5, or for example less than 2 or, further, for example less than 1. The low-Mooney NBR is blended with at least one high-Mooney NBR having a Mooney viscosity (ML 1+4 @ 100° C. according to ASTM test D1646) of more than 30, for example more than 45, or for example more than 50 and further, for example, more than 70.

The low-Mooney, optionally hydrogenated NBR of this invention has a polydispersity index of less than 3, for example less than 2.9, or less than 2.8, or further less than 2.7, or less than 2.6, or preferred less than 2.5, or, for example less than 2.4, or less than 2.3, or further, for example, less than 2.2.

The present invention is not restricted to a special process for preparing the low-Mooney optionally hydrogenated NBR. However, the low-Mooney NBR/HNBR of the present invention is readily available in a two step synthesis as disclosed in CA-2,351,961, CA-2,357,470, CA 2,350,280 and CA 2,357,465, which may take place in the same reaction set-up or different reactors. For jurisdictions allowing for this procedure, CA-2,351,961, CA-2,357,470, CA 2,350,280 and CA 2,357,465 are incorporated herein by reference.

Metathesis

The metathesis reaction is conducted in the presence of one or more compounds of the general formulas I, II, III or IV;

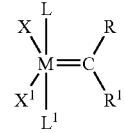

Formula I wherein:

M is Os or Ru,

R and $R^1$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, X and $X^1$ are independently any anionic ligand, and L and $L^1$ are independently any neutral ligand, such as phosphines, amines, thioethers or imidazolidinylidenes or any neutral carbine, optionally, L and $L^1$ can be linked to one another to from a bidentate neutral ligand;

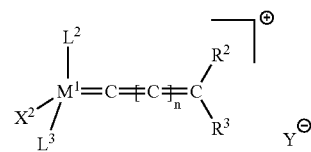

Formula II wherein:

$M^1$ is Os or Ru;

$R^2$ and $R^3$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $X^2$ is a anionic ligand, and $L^2$ is a neutral π-bonded ligand, independent of whether they are mono- or polycyclic, $L^3$ is a ligand selected from the group consisting of phosphines, sulfonated phosphines, fluorinated phosphines, functionalized phosphines bearing up to three aminoalkyl-, ammoniumalkyl-, alkoxyalkyl-, alkoxylcarbonylalkyl-, hydrocarbonylalkyl-, hydroxyalkyl- or ketoalkyl-groups, phosphites, phosphinites, phosphorites, phosphinamines, arsines, stibenes, ethers, amines, amides, imines, sulfoxides, thioethers and pyridines, $Y^-$ is a non-coordinating anion, n is an integer in the range of from 0 to 5;

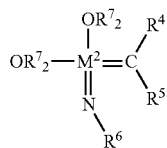

Formula III wherein $M^2$ is Mo or W, $R^4$ and $R^5$ are, independently, hydrogen or a hydrocarbon selected from the group consisting of $C_2$–$C_{20}$ alkenyl, $C_2$–$C_{20}$ alkynyl, $C_1$–$C_{20}$ alkyl, aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl and $C_1$–$C_{20}$ alkylsulfinyl, $R^6$ and $R^7$ are independently selected from any unsubstituted or halo-substituted alkyl, aryl, aralkyl groups or silicon-containing analogs thereof,

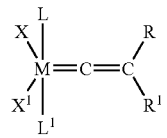

Formula VI wherein:

M is Os or Ru,

R and $R^1$ are independently selected from the group consisting of hydrogen, substituted or unsubstituted alkyl, and substituted or unsubstituted alkyl, X and $X^1$ are independently any anionic ligand, and L and $L^1$ are independently any neutral ligand, such as phosphines, amines, thioethers or imidazolidinylidenes or any neutral carbine, optionally, L and $L^1$ can be linked to one another to from a bidentate neutral ligand;

Compounds of Formula I are preferred. Compounds of Formula I wherein L and $L^1$ are trialkylphosphines, X and $X^1$ are chloride ions and M is Ruthenium are even more preferred.

The amount of compounds will depend upon the nature and catalytic activity of the compound(s) in question. Typically, the ratio of compound(s) to NBR is in the range of from 0.005 to 5, for example in the range of from 0.025 to 1 and, further for example, in the range of from 0.1 to 0.5.

The metathesis reaction is carried out in the presence of a co-olefin such as a $C_2$ to $C_{16}$ linear or branched olefin such as ethylene, isobutene, styrene or 1-hexene. Where the co-olefin is a liquid (such as 1-hexene), the amount of co-olefin employed is, for example, in the range of from 1 to 200 weight %. Where the co-olefin is a gas (such as ethylene) the amount of co-olefin employed is such that it results in a pressure in the reaction vessel in the range of from $1*10^5$ Pa to $1*10^7$ Pa, for example, in the range of from $5.2*10^5$ Pa to $4*10^6$ Pa.

The metathesis reaction can be carried out in any suitable solvent which does not inactivate the catalyst or otherwise interfere with the reaction. Useful solvents include, but are not limited to, dichloromethane, benzene, toluene, tetrahydrofuran, cylcohexane and the like. For example, the solvent can be monochlorobenzene (MCB). In certain cases the co-olefin can itself act as a solvent (for example, 1-hexene), in which case no other solvent is necessary.

The concentration of nitrile polymer (NBR) in the reaction mixture is not critical but, should be such that the reaction is not hampered if the mixture is too viscous to be stirred efficiently, for example. For example, the concentration of NBR is in the range of from 1 to 20% by weight, or for example in the range of from 6 to 15% by weight.

The metathesis reaction can carried out at a temperature in the range of from 20 to 140° C.; for example in the range of from 60 to 120° C.

The reaction time will depend upon a number of factors, including cement concentration, amount of catalyst used and the temperature at which the reaction is performed. The metathesis is usually complete within the first two hours under typical conditions. The progress of the metathesis reaction may be monitored by standard analytical techniques, for example using GPC or solution viscosity. Whenever referenced throughout the specification the molecular weight distribution of the polymer was determined by gel permeation chromatography (GPC) using a Waters 2690 Separation Module and a Waters 410 Differential Refractometer running Waters Millenium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

Hydrogenation

After the metathesis reaction, the nitrile polymer must be hydrogenated to result in a partially or fully hydrogenated nitrile polymer (HNBR). HNBR are preferred in the present invention. Reduction of the product from the metathesis reaction can be effected using standard reduction techniques known in the art. For example, homogeneous hydrogenation catalysts known to those of skill in the art, such as Wilkinson's catalyst $\{(PPh_3)_3RhCl\}$ and the like can be used.

The hydrogenation may be performed in situ i.e. in the same reaction vessel in which the metathesis step is carried out, without the need to first isolate the metathesised product. The hydrogenation catalyst is simply added to the vessel, which is then treated with hydrogen to produce the HNBR.

Grubb's catalyst, in the presence of hydrogen, can be converted to a dihydride complex $(PR_3)_2RuCl_2H_2$, which is itself an olefin hydrogenation catalyst. Thus, in a favorable one-pot reaction, Grubb's catalyst can be used to reduce the molecular weight of NBR in the presence of co-olefin. The reaction mixture can then be treated with hydrogen, converting the Grubb's complex to the dihydride species which then hydrogenates the metathesis product to produce the HNBR of the present invention. The rate of hydrogenation was lower in this case than in the case where Wilkinson's catalyst was used for the hydrogenation step, but it is clear that such an approach is indeed a viable one.

The low Mooney NBR as well as the low Mooney HNBR which forms a component of the polymer blend of the present invention can be characterized by standard techniques known in the art. For example, the molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer Labs. Reference Standards used were polystyrene standards from American Polymer Standards Corp.

The inventive polymer blend further contains at least one nitrile rubber polymer having a Mooney viscosity (ML 1+4 @ 100° C.) above 30. Blending of two or more nitrile rubber polymers having a different Mooney viscosity will usually result in a blend having a bi-modal or multi-modal molecular weight distribution. According to the present invention, the final blend has at least a bi-modal molecular weight distribution.

Molecular weight averages can be calculated based on the data obtained from a GPC analysis. The most frequently cited molecular weight averages include: number average (Mn), weight average (Mw) and Z-average (Mz). These averages are also referred to as the various moments of the distribution. For a monodispersed system (in which each molecule has the same molecular weight), the moments would equal one another, but for a polydisperse system as such in this invention Mz is greater than Mw which is greater than Mn. Higher molecular weight species have a greater influence on the Z and weight averages whereas lower molecular weight species more greatly influence the number average. The breadth of the distribution overall as well as parts of it can be characterized by reference to various ratios, e.g., Mw/Mn and Mz/Mw; the higher the values of the ratio, the broader the distribution of molecular weights. GPC analysis is well established in the art and reference is made to "Gel Permeation Chromatography" by Klaus H. Altgelt and Leon Segal (Marcel Dekker, Inc., 1971) pages 3 to 37, 73 to 80, 105 to 117 and 145 to 153.

In the present invention the overall molecular weight distribution of the polymer was determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer labs. Reference standards used were polystyrene standards from American Polymer Standards Corp.

The ratio of high-Mooney polymer(s) to low-Mooney polymer(s) in the final blend will directly influence the overall Mooney of the final blend as well as the molecular weight distribution itself. Thus it is possible to tailor-make blends with specific processability and performance properties. For example the inventive polymer blend contains in the range of from 0.01 to 70 wt. % of the low-Mooney polymer(s), or for example in the range of from 8 to 33 wt. %

The blending technique is not thought to be crucial to the present invention. Therefore every blending technique of polymers with different Mooney viscosities known to the skilled in the art will be suitable. However, it is preferred to blend the high-Mooney polymer(s) with the low-Mooney polymer(s) in solution. For example, a solution of the high-Mooney polymer(s) can be added to a solution of the low-Mooney polymer(s), optionally the resulting mixture is then mixed and the polymer blend recovered by known techniques, such as steam coagulation. Optionally there will be further process steps such as steam stripping or drying, e.g. on a mill. Or for example, the high-Mooney polymer(s) can be dissolved in a solution containing the low-Mooney polymer(s), optionally the resulting mixture is then mixed and the polymer blend recovered by known techniques, such as steam coagulation. Optionally there will be further process steps such as steam stripping or drying, e.g. on a mill. Or for example, the low-Mooney polymer(s) can be dissolved in a solution containing the high-Mooney polymer(s), optionally the resulting mixture is then mixed and the polymer blend recovered by known techniques, such as steam coagulation. Optionally there will be further process steps such as steam stripping or drying, e.g. on a mill. Obviously, there are many more ways, such as dissolving a low-Mooney polymer(s) in a mixture of a low- and a high-Mooney polymer or mixtures of hydrogenated and non-hydrogenated nitrile rubbers, which are well within the scope of the present invention without explicit mention in this specification.

Before and/or during the whole mixing process other ingredients customary in the rubber field might be added to the mixture.

Specific mention is made of fillers. The filler may be an active or an inactive filler or a mixture thereof. The filler may be, for example, highly dispersed silicas, prepared e.g. by the precipitation of silicate solutions or the flame hydrolysis of silicon halides, with specific surface areas of in the range of from 5 to 1000 $m^2/g$, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 $m^2/g$ and primary particle diameters in the range of from 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

carbon blacks; the carbon blacks to be used here are prepared by the lamp black, furnace black or gas black process and have preferably BET (DIN 66 131) specific surface areas in the range of from 20 to 200 $m^2/g$, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of suitable mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the rubber. For many purposes, the mineral can be silica, for example, silica made by carbon dioxide precipitation of sodium silicate. Dried amorphous silica particles suitable for use in accordance with the present invention may have a mean agglomerate particle size in the range of from 1 to 100 microns, for example between 10 and 50 microns or, for example between 10 and 25 microns.

According to the present invention less than 10 percent by volume of the agglomerate particles should be below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil S and Vulkasil N, from Bayer AG.

Often, use of carbon black as a filler is advantageous. Usually, carbon black is present in the polymer blend in an amount of in the range of from 20 to 200 parts by weight, for example 30 to 150 parts by weight, or for example 40 to 100 parts by weight. Further, it might be advantageous to use a combination of carbon black and mineral filler in the inventive polymer blend. In this combination the ratio of mineral fillers to carbon black is usually in the range of from 0.05 to 20, or for example 0.1 to 10.

The polymer blend may advantageously further contain other natural or synthetic rubbers such as BR (polybutadiene), ABR (butadiene/acrylic acid-$C_1$–$C_4$-alkylester-co polymers), CR (polychloroprene), IR (polyisoprene), SBR (styrene/butadiene-copolymers) with styrene contents in the range of 1 to 60 wt %, EPDM (ethylene/propylene/diene-copolymers), FKM (fluoropolymers or fluororubbers), and mixtures of the given polymers. Careful blending with said rubbers often reduces cost of the polymer blend without sacrificing the processability. The amount of natural and/or synthetic rubbers will depend on the process condition to be applied during manufacture of shaped articles and is readily available by few preliminary experiments.

The polymer blend furthermore optionally contains one or more cross-linking agents or curing systems. The present invention is not limited to a special curing system, however, peroxide curing system are useful. Furthermore, the present invention is not limited to a special peroxide curing system. For example, inorganic or organic peroxides are suitable. Useful organic peroxides include dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butyl-cumylperoxide and tert.-butylperbenzoate. Usually the amount of peroxide in the polymer blend is in the range of from 1 to 10 phr (=per hundred rubber), for example from 4 to 8 phr. Subsequent curing is usually performed at a temperature in the range of from 100 to 200° C., for example 130 to 180° C. Peroxides might be applied advantageously in a polymer-bound form. Suitable systems are commercially available, such as Polydispersion T(VC) D-40 P from Rhein Chemie Rheinau GmbH, D (=polymerbound di-tert.-butylperoxy-isopropylbenzene).

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. For example, the composition can contain in the range of 0.1 to 20 phr of an organic fatty acid as an auxiliary product, such as a unsaturated fatty acid having one, two or more carbon double bonds in the molecule which can include 10% by weight or more of a conjugated diene acid having at least one conjugated carbon-carbon double bond in its molecule. For example, those fatty acids have in the range of from 8–22 carbon atoms, or for example 12–18. Examples include stearic acid, palmitic acid and oleic acid and their calcium-, zinc-, magnesium-, potassium- and ammonium salts. For example, the composition can contain in the range of 5 to 50 phr of an acrylate as an auxiliary product. Suitable acrylates are known from EP-A1-0 319 320, in particular p. 3, I. 16 to 35, from U.S. Pat. No. 5,208,294, Col. 2, I. 25 to 40, and from U.S. Pat. No. 4,983,678, Col. 2, I. 45 to 62. Reference is also made to zinc acrylate, zinc diacrylate or zinc dimethacrylate or a liquid acrylate, such as rimethylolpropanetrimethacrylate (TRIM), butanedioldimethacrylate BDMA) and ethylenglycoldimethacrylate (EDMA). It might be advantageous to use a combination of different acrylates and/or metal salts thereof. For example, to use metal acrylates in combination with a Scorch-retarder such as sterically hindered phenols (e.g. methyl-substituted aminoalkylphenols, in particular 2,6-di-tert.-butyl-4-dimethyl-aminomethylphenol).

The ingredients of the final polymer blend can be mixed together, suitably at an elevated temperature that may range from 25° C. to 200° C. Normally the mixing time does not exceed one hour and a time in the range from 2 to 30 minutes is usually adequate. If the polymer blend is prepared without solvent or was recovered from the solution, the mixing can be suitably carried out in an internal mixer such as a Banbury mixer, or a Haake or Brabender miniature internal mixer. A two-roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Due to the low viscosity of the polymer blend, the polymer blend is ideally suited to be processed by but not limited to molding injection technology. The polymer blend can also be useful to transfer molding, to compression molding, to liquid injection molding. The polymer blend containing a cross-linking system is usually introduced in a conventional injection molding and injected into hot (about 160–230° C.) forms where the cross-linking/vulcanization takes place depending on the polymer blend composition and temperature of the mold.

The inventive polymer blend is very well suited for the manufacture of a shaped article, such as a seal, hose, bearing pad, stator, well head seal, valve plate, cable sheathing, wheel roller, pipe seal, in place gaskets or footwear component prepared by injection molding technology. Furthermore, the inventive polymer blend is very well suited for wire and cable production, especially via extrusion processes.

EXAMPLES

Tris(triphenylphosphine)Rhodium Chloride (Wilkinson's catalyst—hydrogenation), Bis(tricyclohexylphosphine)Benzylidene Ruthenium Dichloride (Grubb's catalyst—metathesis), triphenylphosphine (TPP) and monochlorobenzene (MCB) were purchased from JMI, Boulder Scientific Company, ELF Atochem and PPG respectively and used as received. Polymerization grade ethylene was used for the metathesis reactions.

Example 1a–b

Preparation of Low Mooney Polymer

The metathesis reactions were carried out in a laboratory size reactor under the following conditions:

| | |
|---|---|
| Cement Concentration | 6% |
| Co-Olefin | Ethylene |
| Co-Olefin Concentration | 500 psi |
| Agitator Speed | 600 rpm |
| Reactor Temperature | 80° C. |
| Catalyst Loading | 0.5 phr |
| Solvent | Monochlorobenzene |
| Substrate | statistical Butadiene-acrylonitrileterpolymer with a butadiene content of 47 mol %, an acrylonitrile content of 21 mol %, a butylacrylate content of 32 mol % and a Mooney-Viscosity ML(1 + 4)@100° C. of 29 |

The polymer (75 g) was dissolved in monochlorobenzene (1175 g). The solution was degassed three times using ethylene (100 psi). 60 mL of a monochlorobenzene solution containing the Grubb's catalyst was pressure transferred into the reactor using ethylene. The reactor was heated to 80° C. The reactor was pressurized with ethylene to a pressure of 500 psi. The temperature and ethylene pressure was maintained constant for the duration of the reaction. A cooling coil connected to a temperature controller and a thermal sensor was used to regulate the temperature. The progress of the reaction was monitored using solution viscosity measurements for the 6% cements. After 1 hours the ethylene was vented off and the pressure in the reactor was reduced to approximately 50 psi. Hydrogen was used to purge out the remaining ethylene.

The hydrogenation reactions were carried out in the same reactor as the metathesis under the following conditions:

| | |
|---|---|
| Cement solid concentration | 6% |
| $H_2(g)$ pressure | 1200 psi |
| Agitator Speed | 600 rpm |
| Reactor Temperature | 138° C. |
| Catalyst Loading (Wilkinson's) | 0.08 phr |
| Triphenylphosphine | 1 phr |
| Solvent | Monochlorobenzene |

The cement from the metathesis reaction was degassed 3 times with $H_2$ (100 psi) under full agitation. The temperature of the reactor was raised to 130° C. and a monochlorobenzene solution containing Wilkinson's catalyst and triphenylphosphine was added to the reactor. The temperature was allowed to increase to 138° C. and maintained constant for the duration of the reaction. The hydrogenation reaction was monitored by measuring the residual double bond (RDB) level at various intervals using IR spectroscopy. In case of compound 1a, the hydogenation was stopped after 4 hours, in case of compound 1b, hydrogenation was terminated after 3 hours. Compound 1a had 99.6% of all residual double bonds hydrogenated, compound 1b 99.3%

Alternatively, the Ruthenium metathesis catalyst could be used to hydrogenate the polymer.

Examples 2a–f

Blending

The solutions of Example 1 comprising compound 1a or 1b which were then mixed with solid HNBR (statistical hydrogenated butadiene-acrylonitrilecopolymer with a acrylonitrile content of 34 mol %, a residual double bond content of <0.9% and a Mooney-Viscosity ML (1+4)@ 100 deg. C. of 70 MU. A total solid content of 6% was maintained for each blend. The blends, once mixed were shaken for 12 hrs to complete dissolution of the solid HNBR added and ensure thorough blending with the compound of Experiment 1a or 1b. The blends were then coagulated by high-pressure steam to aziotrope the monochlorobenzene. The resulting polymer (s) were then dried in a vacuum oven at 70° C. until a constant weight(s) was achieved.

The molecular weight distributions of the polymer blends were determined by gel permeation chromatography (GPC) using a Waters 2690 Separation Module and a Waters 410 Differential Refractometer running Waters Millennium software version 3.05.01. Samples were dissolved in tetrahydrofuran (THF) stabilized with 0.025% BHT. The columns used for the determination were three sequential mixed-B gel columns from Polymer labs. Reference standards used were polystyrene standards from American Polymer Standards Corp.

What is claimed is:

1. A polymer blend comprising at least one nitrite rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution.

2. A polymer blend according to claim 1 wherein the nitrite rubber polymer having a Mooney viscosity (ML 1+4 @ 100° C.) below 10 has a Mooney viscosity (ML 1+4 @ 100° C.) below 5.

3. A polymer blend according to claim 1 wherein the nitrile rubber polymer having a Mooney viscosity (ML 1+4 @ 100° C.) below 10 has a Mooney viscosity (ML 1+4 @ 100° C.) below 1.

4. A polymer blend according to claim 1 wherein the polymer blend has a bi-modal molecular weight distribution.

5. A process for preparing a polymer blend according to any of claims 1–4 wherein at least one nitrite rubber polymer having a Mooney viscosity (ML 1+4 @ 100° C.) below 10 and at least one nitrite rubber polymer having a Mooney viscosity (ML 1+4 @ 100° C.) above 30 are mixed in a solvent and the blend is isolated from the solvent.

6. A process for the manufacture of a shaped article comprising the step of injection molding a polymer blend comprising at least one nitrile rubber polymer having a Mooney viscosity (ML 1+4 @ 100° C.) below 10 and at least one nitrite rubber polymer having a Mooney viscosity (ML 1+4 @ 100° C.) above 30 wherein said polymer blend has a multi-modal molecular weight distribution.

7. A process according to claim 6, wherein the shaped article is a seal, gasket, belt, hose, bearing pad, stator, well head seal, valve plate, cable sheathing, wheel roller, in place gaskets or pipe seal.

8. A process for the manufacture of a shaped article comprising the step of liquid injection molding a polymer blend comprising at least one nitrile rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution.

9. A process for the manufacture of a shaped article comprising the step of compression and/or transfer molding a polymer blend comprising at least one nitrile rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution.

10. A process for the manufacture of a shaped article comprising the step of extruding a polymer blend comprising at least one nitrile rubber polymer having a Mooney viscosity (ML 1+4 @ 100° C.) below 10 and at least one nitrile rubber polymer having a Mooney viscosity (ML 1+4 @ 100° C.) above 30 wherein said polymer blend has a multi-modal molecular weight distribution.

11. A process according to claim 8, wherein the shaped article is a seal, gasket, belt, hose, bearing pad, stator, well head seal, valve plate, cable sheathing, wheel roller, in place gaskets or pipe seal.

12. A process according to claim 9, wherein the shaped article is a seal, gasket, belt, hose, bearing pad, stator, well head seal, valve plate, cable sheathing, wheel roller, in place gaskets or pipe seal.

13. A process according to claim 10, wherein the shaped article is a seal, gasket, belt, hose, bearing pad, stator, well head seal, valve plate, cable sheathing, wheel roller, in place gaskets or pipe seal.

* * * * *